March 24, 1931. J. J. HEIMRICH 1,797,827
GEOMETRICAL INSTRUMENT
Filed March 22, 1928 2 Sheets-Sheet 2
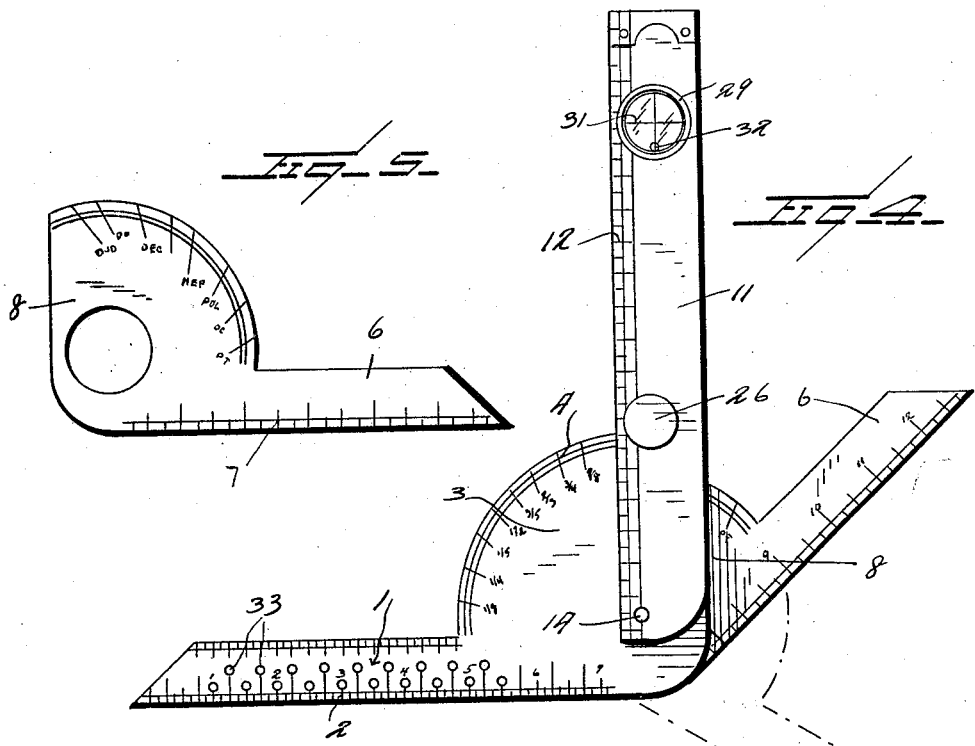
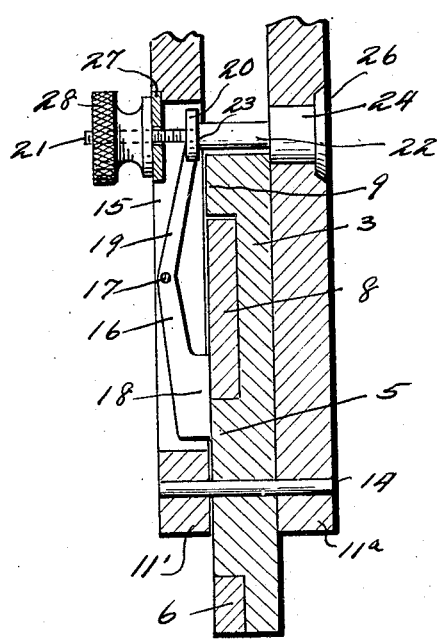
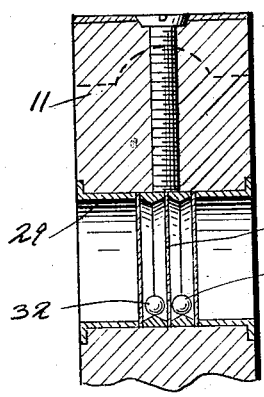
Inventor
J. J. Heimrich
By Watson E. Coleman
Attorney Patented Mar. 24, 1931

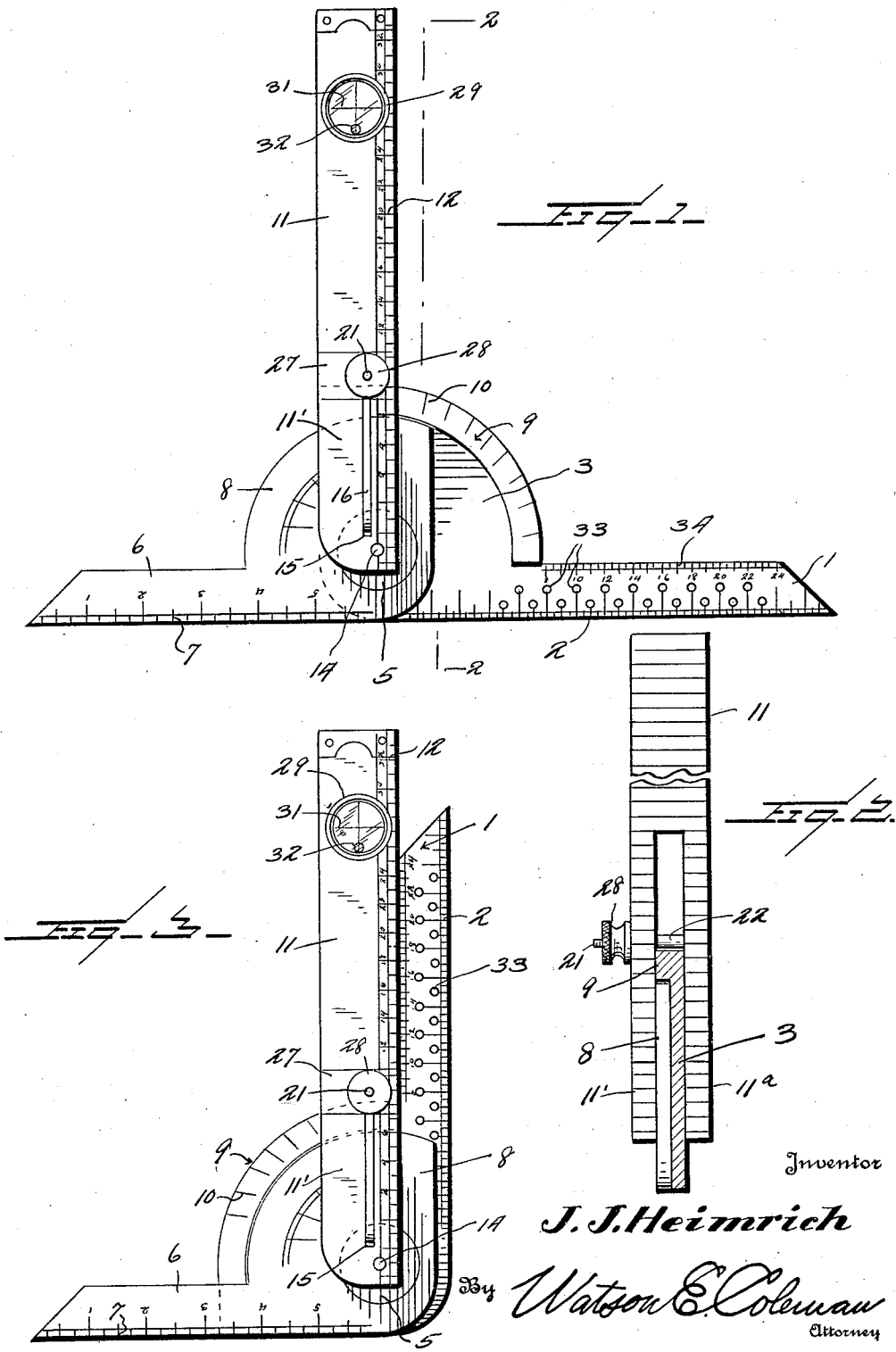

1,797,827

UNITED STATES PATENT OFFICE

JOSEPH J. HEIMRICH, OF KEARNY, NEW JERSEY

GEOMETRICAL INSTRUMENT

Application filed March 22, 1928. Serial No. 263,863.

This invention relates to a geometrical instrument and has relation more particularly to a device of this kind of a straight edge type and which embodies the features of a gauge and level, and it is primarily an object of the invention to provide a device of this kind which can be employed with particular facility by millwrights, stair builders, ship builders, carpenters and, in fact, by anyone requiring the use of a level or square.

Furthermore, it is an object of the invention to provide an instrument of this kind which possesses particular adaptability in laying out rafters and in a manner whereby can be readily computed or ascertained the rafter cut of any pitch roof and also the desired length of the rafters.

Another object of the invention is to provide a device of this kind comprising a plurality of relatively movable members provided with suitable indicia to permit the desired computations and wherein means are employed for effectively holding such members in required selective relative arrangement.

The invention consists in the details of construction and in the combination and arrangement of the several parts of my improved geometrical instrument whereby certain important advantages are attained and the device rendered simpler, less expensive and otherwise more convenient and advantagous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in plan of an instrument constructed in accordance with an embodiment of my invention with the various parts in extended relation;

Figure 2 is a detailed sectional view taken substantially on the line 2—2 of Figure 1;

Figure 3 is a view in plan illustrating one of the members in a folded position providing an assembly to permit the instrument to be employed as a square;

Figure 4 is a view in plan illustrating the various members of the device in a separated position;

Figure 5 is a view in plan of the base or protractor member;

Figure 6 is an enlarged fragmentary view partly in section and partly in elevation illustrating the means herein employed for maintaining the various members in desired relative arrangement;

Figure 7 is an enlarged fragmentary sectional view illustrating the plumb and level carried by the stock member of the instrument.

As herein disclosed, my improved instrument comprises a base or protractor member 1 provided along an outer marginal portion with the linear graduations 2 and provided at one end portion with a quadrant protractor plate 3 provided around its curved marginal portion with the graduations 4 for indicating pitches. The plate 3 at the axial center of the arcuate edge thereof is provided with a circular boss 5 which provides a pivotal mounting for an end portion of the bevel blade 6 provided along its outer longitudinal marginal portion with the linear graduations 7. The inner pivotally mounted end portion of the blade 6 is also provided with a quadrant plate 8 overlying the quadrant plate 3 hereinbefore referred to but having its arcuate edge arranged inwardly of the arcuate edge of the plate 3 but closely approaching the inner marginal portion of an outstanding flange 9 defining the arcuate edge of the plate 3 and extending outwardly from a face thereof. The outer face of this flange 9 is provided with the pitch graduations 10.

Straddling the assembled or overlying plates 3 and 8 is the bifurcated end portion of a stock 11 provided along a marginal portion with the graduations 12 particularly intended for use in computing rafter lengths. The bifurcated extremity of the stock 11 is pivotally connected by a pin 14 with the blade 1 which is disposed through the blade 1 at the axial center of the circular or cylindrical boss 5 and with which the curved or arcuate edge of the plate 8 is also concentric.

A leg 11′ of the bifurcated portion of the stock 11 has disposed therethrough the longitudinally directed slot 15 in which is arranged a holding lever 16 supported for swinging movement in a direction toward or from the plate 8 and the boss 5 by the pin 17 or the like. The outer end portion of the lever 16 is provided with a laterally directed elongated foot 18 disposed toward the plate 8 and boss 5 and of a length to have firm contact with both when moved in a direction toward the same.

The pivotally mounted end portion of the lever 16 is provided with an angularly disposed tail piece or arm 19 terminating in an eye member 20 through which is directed a reduced threaded portion 21 of a shank 22, said reduced portion 21 providing a shoulder 23 with which the eye member 20 is adapted to contact. The shank 22 at its opposite end is provided with an enlarged portion 24 arranged within the second leg 11a of the bifurcated portion of the stock 11 and this portion 24 is provided with the outstanding annular flange 26 coacting with the outer face portion of the leg 11′ whereby the movement of the shank 22 in one direction is limited.

The threaded reduced portion 21 is freely disposed through a metallic plate 27 bridging the inner portion of the slot 15 and secured to the leg 11′ in any desired manner. Threaded upon the portion 21 outwardly of the plate 27 is a knurled nut 28 or the like having contact with the plate 27 when rotated in one direction to effect an inward swinging movement of the lever 16 to assure an effective locking of the blades 1 and 6 one with respect to the other and with respect to the stock 11.

The stock 11 in its outer portion has mounted therein a plumb 29 of a double gravity type and comprising a central plate 30 provided on each of its faces with the perpendicularly related and crossed hair lines 31 and in connection with each face coacts a weighted member 32 preferably a spherical body.

The blade 1 is provided in proper relation with respect to the graduations with suitable openings 33 through which a pencil or other desired marking element may be selectively directed whereby the blade 1 may be employed with facility and advantage as a gauge. The inner marginal portion of the blade 1 is also provided with the graduations 34 so computed with respect to the graduations 12 on the stock 11 as to permit ready determination of a rafter lay.

An instrument constructed in accordance with an embodiment of my invention is capable of use in connection with work of any character and by anyone using a level or square such as millwrights, stair builders, ship builders, carpenters, etc., and it is also capable of efficient use in connection with the lining up of shafting and other parts of machinery.

It is not believed necessary that an explanation be given of the various uses to which the instrument can be put as it is believed obvious to anyone requiring an instrument of this kind just how it can be employed, the efficiency of the instrument residing in its assembly which affords an effective means whereby the various relatively movable parts may be adjusted as desired and maintained in such adjustment. It is to be further stated that the efficiency of the instrument is materially increased by provision of the plumb which is considered to be an important element of the instrument as it assures the workman accurately obtaining the vertical which is particularly desirable for adverse conditions. An especial advantage of the instrument, as herein disclosed, is the facility to compute a rafter lay.

With the width of the building and the pitch required known, in laying out a rafter the instrument is doubled up to use as a square to mark a square line on any part of the timber to be cut. After this operation the stock 11 is swung along the quadrant scale 10 to the pitch required. Presuming the width of the building to be twenty-four feet, the instrument is moved in a direction from the square mark or line produced on the timber until the indication "12" of the stock 11 registers with the square line or mark on the timber which is the equivalent to the ridge line of the building structure, said graduation "12" indicating one-half of the width of the building. During this operation the blade 1 will be adjusted whereby the square or ridge line on the timber will register with the graduation "17" along the inner marginal portion of said blade 1 indicating that the desired length of the rafter should be seventeen feet.

To secure the bottom cut of the timber, the tool is held in the same assembly but reversed to bring the opposite side of the stock 11 against the timber, using the blade 1 for bottom cut which is brought down until width of bottom cut is the same as the sill upon which the bottom cut is to be rested.

From the foregoing description it is thought to be obvious that a geometrical instrument constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An instrument of the character described, comprising a pair of blades each having a quadrant formed at one end and in overlapping relation one with the other, means for pivotally connecting said quadrants at the radial centers thereof, one of said quadrants being of greater radius than the other and having a laterally projecting flange upon one face adjacent and conforming to the curved edge thereof and overlying the curved edge of the adjacent quadrant, and a graduated stock pivotally connected at one end to one of said quadrants to swing about the pivotal center of the quadrants.

2. An instrument of the character described, comprising a pair of blades each having a quadrant formed at one end and in overlapping relation one with the other, means for pivotally connecting said quadrants at the radial centers thereof, one of said quadrants being of greater radius than the other and having a laterally projecting flange upon one face adjacent and conforming to the curved edge thereof and overlying the curved edge of the adjacent quadrant, a graduated stock pivotally connected at one end to one of said quadrants to swing about the pivotal center of the quadrants, and means carried by said stock for frictionally engaging portions of said quadrants to maintain the same and the stock in adjusted position.

3. An instrument of the character described, comprising a pair of blades each having a quadrant formed at one end and in overlapping relation one with the other, means for pivotally connecting said quadrants at the radial centers thereof, one of said quadrants being of greater radius than the other and having a laterally projecting flange upon one face adjacent and conforming to the curved edge thereof and overlying the curved edge of the adjacent quadrant, and a graduated stock bifurcated at one end and having said quadrants positioned between the members of said bifurcated end, one of said members being secured to one of said quadrants to pivot the stock upon the pivotal center of the quadrants, and an adjustable friction clamp carried by the stock and having frictional engagement with said quadrants to maintain the same in adjusted position.

4. An instrument of the character described, comprising a pair of blades each having a quadrant plate formed at one end, one of said plates having an outstanding circular boss concentric with the radial center of the plate, the other plate having a circular aperture therethrough concentric with the radial center thereof and designed to receive said boss, a stock having a bifurcated end and having said plates positioned between the members formed by said bifurcation, a pivot pin extended through the members of said bifurcated end and through the radial center of said boss, that member of the stock overlying said boss having a slot formed longitudinally therethrough, an oscillatable arm pivotally mounted intermediate its ends in said slot and having a friction head at one end adapted to engage the boss and a portion of the plate surrounding it, and means carried on the stock and engaging the other end of the arm for oscillating the same.

5. An instrument of the class described comprising a blade having an outstanding circular boss adjacent to one end, a second blade having an opening through an end portion in which the circular boss is disposed to connect said blades for relative swinging movement, a stock having a bifurcated end portion straddling the connected end portions of the blades, pivot means between said first mentioned blade and the stock, said means being disposed through the axial center of the boss, and means carried by the stock for contact with said second blade and the boss for holding the blades and the stock in desired relative adjustment.

6. An instrument of the class described comprising a blade having an outstanding circular boss adjacent to one end, a second blade having an opening through an end portion in which the circular boss is disposed to connect said blades for relative swinging movement, a stock having a bifurcated end portion straddling the connected end portions of the blades, pivot means between said first mentioned blade and the stock, said means being disposed through the axial center of the boss, a lever pivotally engaged with the stock, an end portion of which contacts with said second blade and the boss upon movement in a direction toward the same for holding the blade and stock in desired relative adjustment, and means for moving the lever into such contact.

In testimony whereof I hereunto affix my signature.

JOSEPH J. HEIMRICH.